(12) United States Patent
Pera et al.

(10) Patent No.: US 10,298,086 B2
(45) Date of Patent: May 21, 2019

(54) ROTATING ELECTRIC MACHINE

(71) Applicant: MOTEURS LEROY-SOMER, Angouleme (FR)

(72) Inventors: Thierry Pera, Belfort (FR); Philippe Ciciliani, Valentigney (FR); Bernard Corberand, Herimoncourt (FR)

(73) Assignee: MOTEURS LEROY-SOMER, Angouleme (FR)

( * ) Notice: Subject to any disclaimer, the term of this patent is extended or adjusted under 35 U.S.C. 154(b) by 150 days.

(21) Appl. No.: 15/124,825

(22) PCT Filed: Mar. 6, 2015

(86) PCT No.: PCT/IB2015/051646
§ 371 (c)(1),
(2) Date: Sep. 9, 2016

(87) PCT Pub. No.: WO2015/136422
PCT Pub. Date: Sep. 17, 2015

(65) Prior Publication Data
US 2017/0033641 A1 Feb. 2, 2017

(30) Foreign Application Priority Data

Mar. 12, 2014 (FR) ..................... 14 52059

(51) Int. Cl.
*H02K 5/16* (2006.01)
*H02K 5/20* (2006.01)
*H02K 15/00* (2006.01)
(52) U.S. Cl.
CPC ............. *H02K 5/20* (2013.01); *H02K 5/16* (2013.01); *H02K 15/00* (2013.01)

(58) Field of Classification Search
CPC .................................. H02K 5/16; H02K 5/20
USPC ................. 310/54, 58–61, 90, 90.5
See application file for complete search history.

(56) References Cited

U.S. PATENT DOCUMENTS

| 6,441,518 | B1 | 8/2002 | Yockey et al. | |
| 7,102,267 | B2* | 9/2006 | Gromoll | H02K 9/14 |
| | | | | 310/260 |
| 7,737,584 | B2* | 6/2010 | Muller | H02K 5/20 |
| | | | | 310/52 |
| 8,183,724 | B2* | 5/2012 | Rodriguez Rodriguez | |
| | | | | H02K 5/20 |
| | | | | 310/54 |
| 9,768,669 | B2* | 9/2017 | Huber | H02K 9/19 |

(Continued)

FOREIGN PATENT DOCUMENTS

DE 101 45 339 A1 3/2002

OTHER PUBLICATIONS

International Search Report with English Translation for PCT/IB2015/051646.
Written Opinion for PCT/IB2015/051646.

*Primary Examiner* — Jeremy A Luks
(74) *Attorney, Agent, or Firm* — Jones Robb, PLLC

(57) ABSTRACT

A rotating electric machine comprising at least one end flange carrying a bearing, and a housing onto which the end flange is attached, said housing being cooled by a liquid cooling circuit and having at least two connectors communicating with the cooling circuit. The two connectors allow the supply and return of cooling liquid to and from the flange when the flange is configured to be cooled by a flow of the cooling liquid.

9 Claims, 2 Drawing Sheets

(56) References Cited

U.S. PATENT DOCUMENTS

| | | | |
|---|---|---|---|
| 2003/0048031 A1* | 3/2003 | Dunlap | H02K 5/20 |
| | | | 310/254.1 |
| 2005/0151431 A1 | 7/2005 | Cronin et al. | |
| 2009/0015081 A1 | 1/2009 | Takenaka et al. | |
| 2013/0015735 A1 | 1/2013 | Lepres et al. | |

* cited by examiner

ROTATING ELECTRIC MACHINE

This application is a national stage application of International PCT Application No. PCT/IB2015/051646, filed internationally on Mar. 6, 2015, which claims priority to French Application No. FR 14 52059, filed Mar. 12, 2014, the entire content of each of which is incorporated by reference herein in its entirety.

The present invention relates to liquid-cooled rotating electric machines, and more particularly to liquid-cooled, in particular water-cooled, electric motors.

In accordance with the intended applications or design constraints, some parts of a rotating machine may or may not require cooling. In particular, in the case of a housing comprising bearings associated with a pivot mechanism, it may be necessary to cool the pivot mechanism, and therefore to provide the bearings with a cooling system. Conversely, in other applications or within the scope of other design constraints, the use of cooled bearings may be unnecessary.

This variety of applications hinders the construction of such machines as well as the supply in loose parts necessary for their servicing.

The invention aims to further improve rotating electric machines and to reduce the diversity of parts forming said machines so as to facilitate their maintenance and industrialization.

The invention achieves this thanks to a rotating electric machine comprising:
- at least one end flange carrying a bearing,
- a housing onto which the end flange is attached, this housing being cooled by a liquid cooling circuit and having at least two connectors communicating with said cooling circuit, the two connectors allowing the supply and return of cooling liquid to and from the flange when the latter is designed to be cooled by a flow of the cooling liquid.

The presence of the two connectors makes it possible to use the same housing in combination with bearings cooled by a liquid flow, or in combination with uncooled bearings. This allows a greater modularity and considerably facilitates the manufacture, the maintenance, and the management of the loose parts of the machines in question.

The invention thus also relates to a range consisting of at least two rotating machines according to the invention, the housings of the two machines being identical, at least one of the machines comprising a flange cooled by liquid and at least one other of the machines comprising a flange not cooled by liquid.

The invention also relates to a method for manufacturing a range of rotating electric machines according to the invention, in which a plurality of identical housings are manufactured and bearings, which may or may not be cooled by liquid depending on the requirements, are assembled on each housing; in the case of liquid-cooling of the bearing, this is connected to the connectors of the housing, and in the case of no liquid-cooling of the bearing, the connectors of the housing are not used or are connected to each other.

The two connectors are preferably connected together so as to allow the circulation of the cooling liquid therebetween when the flange does not need to be cooled by a flow of the cooling liquid. This makes it possible to avoid a disconnection of the liquid flow circuit of the housing.

The two connectors are preferably disposed in the proximity of the corresponding flange.

The electric machine according to the invention may comprise two pairs of connectors, each for the cooling of a corresponding flange of the machine. In this case, each pair of connectors can be disposed in the proximity of the corresponding flange.

The connection between the connectors of the housing and the corresponding flange is established preferably with the aid of external ducts, which preferably are rigid. This may advantageously facilitate the removability of the latter, and the changing of the bearings, whilst promoting the cooling of the liquid at the ducts.

The connection between the connectors in the absence of liquid-cooling of the flange is established preferably by a sole part, connected to the housing. The use of a sole part makes it possible to limit the number of parts whilst limiting the risk of a loss of tightness.

The rotating electric machine according to the invention is preferably an engine. Engines that use cooling by means of a liquid flow are, for example, engines used in naval applications. The machine according to the invention may be such an engine, and the cooling liquid may then be seawater.

The invention will be better understood upon reading the following detailed description of a non-limiting exemplary embodiment thereof and upon examining the accompanying drawing, in which:

FIG. 1 shows a rotating electric machine 1, in the present case an engine, comprising a housing 10 forming a relatively closed and tight enclosure preferably having a water protection rating of IP55 or above.

Figure 1:
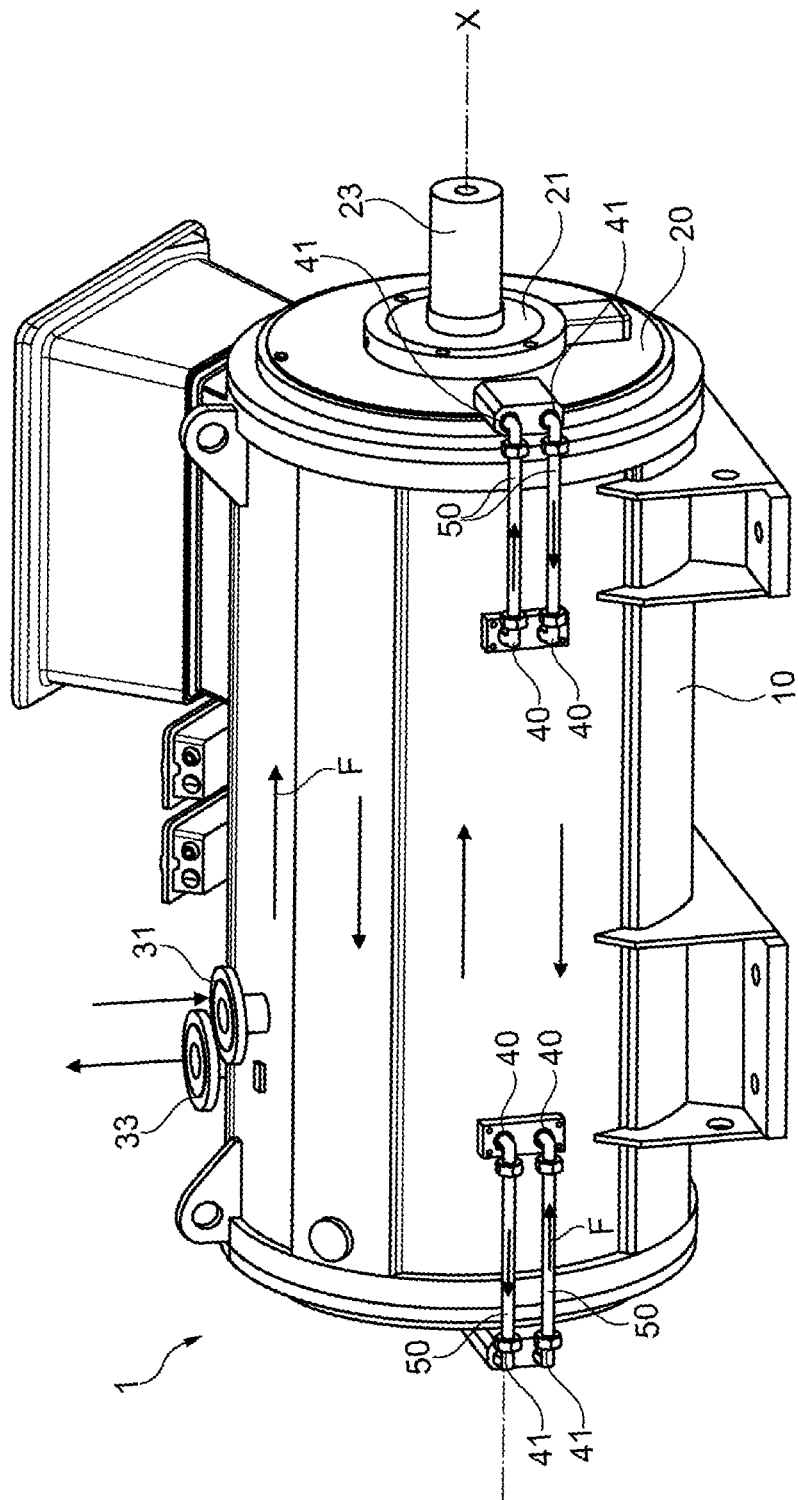
FIG. 1 shows an example of a rotating electric machine according to the invention, comprising bearings cooled by a flow of cooling liquid.

The housing 10 is of an elongate shape along an axis X, being closed at its two ends by flanges 20 which define a front side and a rear side.

Each flange 20 carries a bearing 21 connected to a shaft 23 by means of rollers (not shown).

The engine is cooled by a flow of liquid F, for example water, which originates from an external source and penetrates the housing 10 at an inlet 31, flows in channels within the housing 10, passes via connectors 40, and leaves again to the outside at an outlet 33.

In the case in which the bearings are cooled by liquid, as illustrated in FIG. 1, the bearings comprise connectors 41 which are connected to the connectors 40 of the housing 10 by means of external ducts 50. The flow of liquid then passes successively:
- via the inlet 31,
- via the channels in the housing,
- in channels in the bearing via connectors 40 of the housing, external ducts 50, and connectors 41 of the bearings,
- in the channels of the housing via connectors 41 of the bearings, external ducts 50, and connectors 40 of the housing, and
- via the outlet 33.

Figure 2:
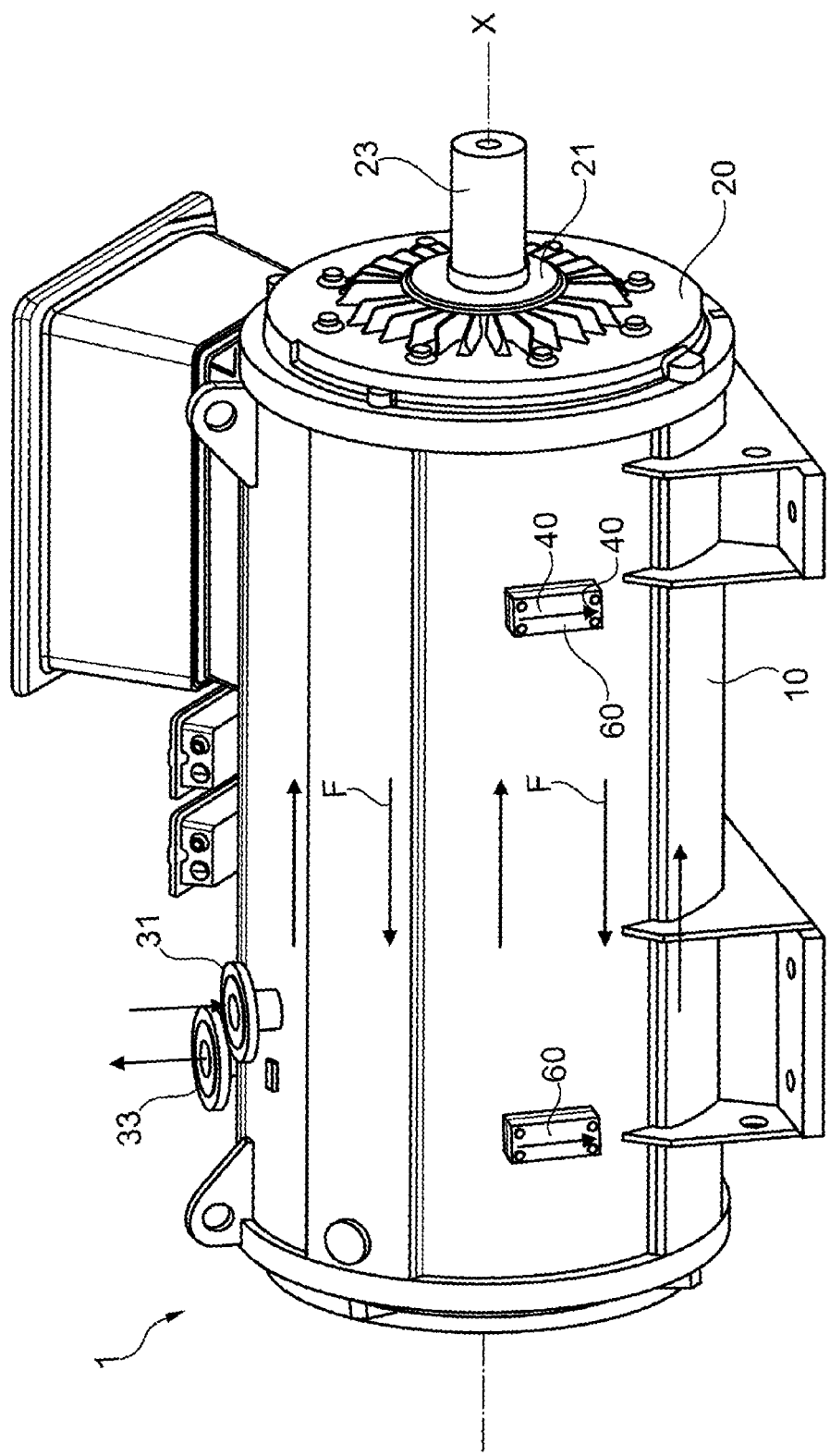
FIG. 2 shows an example of a rotating electric machine comprising the housing of the machine of FIG. 1 with bearings not cooled by a flow of cooling liquid.

In the case in which the bearings are not cooled by liquid, as illustrated in FIG. 2, the connectors 40 of the housing are connected to each other via a sole part 60 attached to the housing 10, preferably in a tight manner. In this way, the flow of liquid passes via the same parts of the housing 10 as in the case illustrated in FIG. 1.

Because the pressure loss is not the same depending on whether the liquid circulates both in the housing and in the bearings or solely in the housing, the pressure at the inlet is adjusted as necessary.

In the case of engines used in marine applications, the cooling liquid is seawater, for example. The flow of liquid makes it possible to cool the stator.

The invention is not limited to the example just described and may be applied in particular to electric motors in applications other than marine applications. The cooling liquid may circulate in a closed loop between the engine and an installation for cooling this liquid, or in a variant in an open circuit, the water injected into the engine being discharged into the environment, which may be the case for example with cooling by means of seawater.

The term "comprising" should be understood as being synonymous with "including at least", unless otherwise specified.

The invention claimed is:

1. A rotating electric machine comprising:
   at least one end flange carrying a bearing, and
   a housing onto which the at least one end flange is attached, the housing being cooled by a liquid cooling circuit and having at least two connectors communicating with said cooling circuit, the at least two connectors allowing a supply and return of cooling liquid to and from the at least one end flange when the at least one end flange is configured to be cooled by a flow of the cooling liquid, the at least two connectors being connected together so as to allow circulation of the cooling liquid between the at least two connectors when the at least one end flange does not need to be cooled by a flow of the cooling liquid.

2. The machine as claimed in claim 1, the at least two connectors being disposed in a proximity of the at least one end flange.

3. The machine as claimed in claim 1, wherein the at least one end flange comprises two flanges and wherein the at least two connectors comprise two pairs of connectors, each pair of connectors being configured for cooling a respective one of the two flanges of the machine.

4. The machine as claimed in claim 3, each pair of connectors being disposed in a proximity of the respective one of the two flanges.

5. The machine as claimed in claim 1, further comprising external ductwork configured to provide a connection between the at least two connectors of the housing and the at least one end flange.

6. The machine as claimed in claim 1, wherein connection between the at least two connectors in the absence of liquid-cooling of the at least one end flange is established by a sole part connected to the housing.

7. The machine as claimed in claim 1, wherein the machine is an engine.

8. A system of at least two rotating electric machines, each rotating electric machine comprising:
   at least one end flange carrying a bearing, and
   a housing onto which the at least one end flange is attached, the housing being cooled by a liquid cooling circuit and having at least two connectors communicating with said cooling circuit, the at least two connectors allowing a supply and return of cooling liquid to and from the at least one end flange when the at least one end flange is configured to be cooled by a flow of the cooling liquid,
   the housings of the two machines being identical, at least one of the machines comprising a flange cooled by liquid and at least one other of the machines comprising a flange not cooled by liquid.

9. A method for manufacturing a system of rotating electric machines as defined in claim 8, in which a plurality of identical housings are manufactured and bearings are assembled on each housing, wherein:
   for the electric machine using liquid-cooling of the bearing, the bearing is cooled by the cooling circuit via connection to the connectors of the housing, and
   for the electric machine not using liquid-cooling of the bearing, the connectors of the housing are not used or are connected to each other.

* * * * *